July 8, 1958      E. H. REYNOLDS      2,842,648
HEAT SENSITIVE ELECTRIC CABLES

Filed Feb. 11, 1955      3 Sheets-Sheet 1

Inventor
Edward H Reynolds
By
Webb Mackey & Burden
Attorney

July 8, 1958  E. H. REYNOLDS  2,842,648
HEAT SENSITIVE ELECTRIC CABLES
Filed Feb. 11, 1955  3 Sheets-Sheet 2
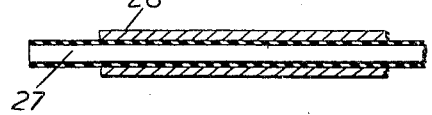
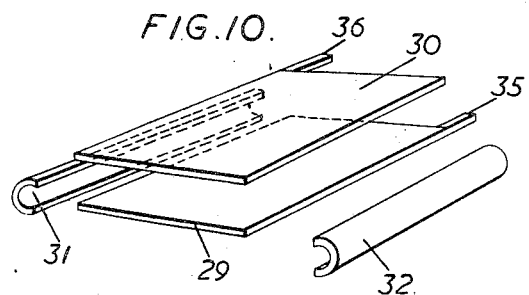
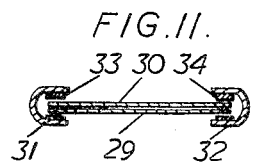
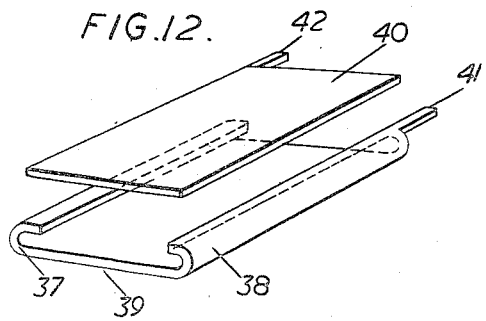
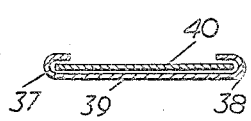
Inventor
Edward H. Reynolds
By
Webb Mackey & Burden
Attorney July 8, 1958  E. H. REYNOLDS  2,842,648
HEAT SENSITIVE ELECTRIC CABLES
Filed Feb. 11, 1955  3 Sheets-Sheet 3
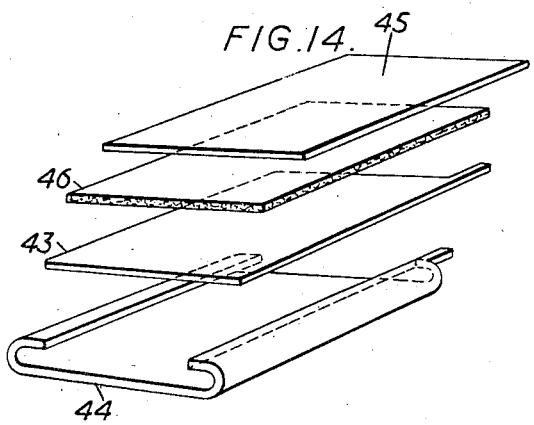
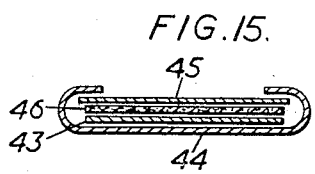
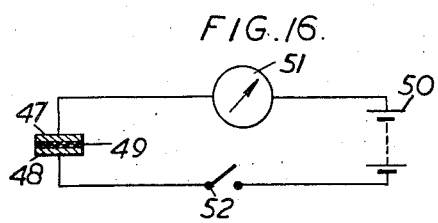
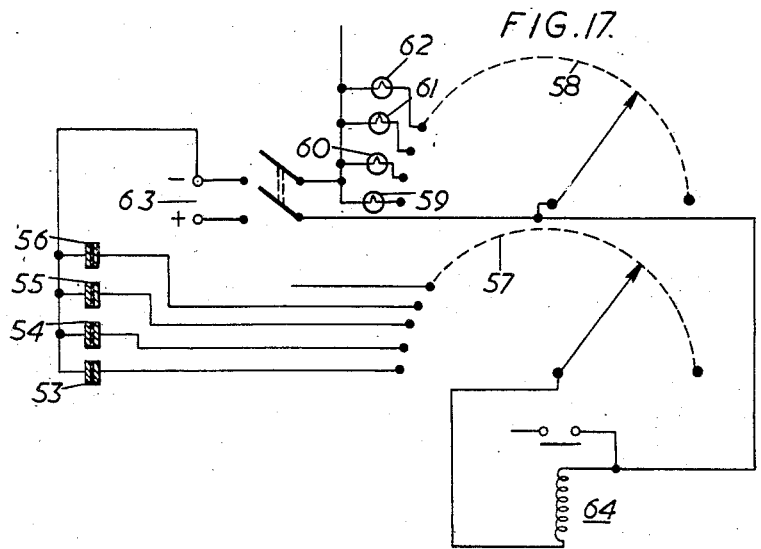
Inventor
Edward H. Reynolds
By
Watt, Mackey & Burden
Attorney

United States Patent Office 2,842,648
Patented July 8, 1958

2,842,648

HEAT SENSITIVE ELECTRIC CABLES

Edward Henry Reynolds, London, England, assignor to British Insulated Callender's Cables Limited, London, England, a British company Application February 11, 1955, Serial No. 487,607

Claims priority, application Great Britain February 25, 1954

20 Claims. (Cl. 201—63)

This invention relates to heat sensitive electrical devices of the kind in which two conductors are separated by insulating material consisting of or including a substance which shows a marked decrease of resistance with increase of temperature. Such devices are useful for indicating a rise in temperature, particularly when caused by a fire, for example in a building or aircraft, the device being used for the actuation of a fire alarm.

In accordance with the invention one (or more) conductors of the device is made partly or wholly of a metal which can be treated to form an adherent porous layer of a compound of the metal on its surface. A layer of this kind, formed on the surface of a conductor, is impregnated with a substance which gives to the composite layer thus formed the required electrical properties to form the insulating layer between two conductors of the device. Such substances will hereinafter be referred to as "heat sensitive insulating materials." The device comprises one conductor of this kind with its impregnated surface layer in contact with another conductor or two conductors of this kind with their impregnated surface layers in contact.

I prefer to use aluminium or a suitable alloy of aluminium for the conductor(s) on which a porous surface layer is formed because of the unique properties of the anodic film which can be simply and cheaply formed on aluminium; anodic films of controlled porosity can be obtained, they adhere strongly to the metal and are chemically inert. It may often be desirable to heat the conductor to temperatures at which an aluminium conductor would weaken by annealing, either in service or when forming the heat sensitive insulating material in situ. In such cases we prefer to coat or clad a metal or alloy having a higher annealing temperature than aluminium with aluminium and to anodise the aluminium surface layer.

An alloy which we have found to be particularly suitable for this purpose is the binary alloy of aluminium and steel containing 14% of aluminium. The aluminium layer adheres well to this alloy and can be so thin that it is substantially completely converted to the oxide.

The heat sensitive insulating material may be applied directly to the surface layer by impregnation of this layer with a solution of the material in an aqueous or other solvent or may be formed in situ. For example, an anodised aluminium wire may be immersed in a solution of a nitrate of sodium, potassium or magnesium and then dried. Alkaline earth and other metal oxides, for example the oxides of titanium or barium, may be formed in situ by impregnating the anodic layer with a solution of a compound of the metal, of a kind which decomposes on heating to form the required oxide, and then heating the conductor. The latter process may be used to form manganese, iron and nickel oxides in the anodic layer, suitable soluble salts of these metals being the nitrates, formates and acetates.

Another method of introducing a heat sensitive material into the porous layer is by a double decomposition reaction. For example, a soluble metal salt may be introduced into the layer by impregnation and this salt may be replaced by an insoluble salt by immersing the layer in a solution of a soluble metal salt, the cation of which forms an insoluble salt with the anion of the salt first introduced and the anion of which forms a soluble salt with the cation of the salt first introduced. The soluble salt formed by double decomposition can be leached out of the layer leaving the insoluble salt in the layer. The salt remaining may itself be the heat sensitive material or it may be converted to the desired material by heating. In this way barium oxalate can be introduced by first immersing the layer in a solution of barium chloride and then in a solution of ammonium or sodium oxalate; sodium chloride is leached from the layer leaving insoluble barium oxalate which is converted to the oxide by heating.

The heat sensitive material will be selected in accordance with the use for which the device is intended. In general the materials will be ionic compounds, or compounds in which both ionic and homopolar bonds are present. They may either be materials which show a marked increase in conductivity with rise of temperature up to their melting point or materials which in addition show a marked increase in conductivity when they melt. It is advantageous to choose a material which melts at the lowest temperature to be indicated by the device, particularly when the device is used to detect a flame impinging on a surface, such as the nacelle of an aircraft engine.

Another factor of importance in choosing the material is the porosity of the layer which the material is to permeate.

A preferred class of materials comprises those nitrates, halides, chlorates and perchlorates of the alkaline earth metals and the alkali metals, i. e. lithium, sodium, potassium, rubidium, caesium, calcium, strontium, barium and zirconium, which are thermally stable and non-hygroscopic.

Of these materials we prefer to use sodium or potassium nitrate, when the device is to be used to operate at 350°–360° C. as for example for detecting flames in an aircraft jet engine, since the change in electrical resistance of these materials at the critical temperature is considerable and hence only a very simple electrical circuit consisting of a battery and a relay is needed. When using materials showing an approximately linear change of resistance with temperature, over the critical temperature range, a more sensitive electrical detector circuit involving electronic devices becomes necessary.

Other classes of heat sensitive materials are (a) the chlorides, bromides and iodides of sodium, potassium, rubidium, caesium, strontium, barium and thallium and sodium fluoride.

(b) The chromates of potassium, sodium and magnesium.

(c) The oxides of calcium, magnesium, barium, strontium, titanium, cadmium, manganese (MnO), copper (CuO) and nickel (NiO).

(d) Mixtures of the oxides of barium, calcium, magnesium, strontium with titanium dioxide and the titanates formed from these metals, all with or without zirconium oxide.

The device may, for example, be in the form of a cable comprising a pair of anodised aluminium wires, both having their anodic coating impregnated with a suitable heat sensitive insulating material, twisted together with or without a supporting wire, for example of Nichrome, and provided with an overall protective covering, for example a thin walled metal sheath, a glass braid impregnated with a heat resisting lacquer or an asbestos fibre covered with a glass braid. Alternatively one of the conductors may be a wire of anodised aluminium and the other a wire of another metal or alloy, for example Nichrome, copper, tinned copper or nickel coated copper. A further possibility is to form a concentric cable by enclosing an anodised and impregnated aluminium wire in a thin walled metal sheath which forms the second conductor. The sheath may be applied by extrusion and drawn down to make it a close fit on the insulation. Suitable metals are aluminium and lead.

The device may alternatively be in the form of a sheet or strip. For example one conductor of the device may be a sheet or strip of metal foil or a sheet or strip of a non-metallic material with a metallised surface, the metal of the foil or the metal with which the surface is metallised being one which can be treated to form an adherent porous layer of a compound of the metal on its surface. A layer of this kind formed on the surface is impregnated with a substance which gives to the composite layer thus formed the required electrical properties. Two such strips or foils may be arranged with their impregnated surface layers held in contact, for example, by means of rivets passing through the strips and insulated from one of them or alternatively another metallic layer with an untreated surface may be applied to the treated surface of the first layer. This may be a metal foil or a sprayed metal coating.

Another method of construction of the device is to build up the sheet or strip from wires, some or all of which have on their surfaces an adherent porous layer impregnated with a heat sensitive insulating material.

The wires may be woven together in such a way that where they cross there is contact between the impregnated surface layers of two wires or between the impregnated surface layer of one wire and the plain surface of another wire. The warp and weft of the mesh formed may each consist of a single wire or either or both may each consist of a set of wires connected in parallel. The wires or sets of wires forming both warp and weft may both have an impregnated surface layer or only the wire or set of wires forming the warp may have an impregnated surface layer, while the wire or set of wires forming the weft is plain, or vice versa.

The wires may be incorporated in a sheet of heat resisting fabric, for example glass fabric, or a woven fabric may be formed from wires and heat resisting threads or fibres, such as glass fibres.

In all cases the construction is such that throughout the sheet or strip formed there are regions of contact between the coated or uncoated surfaces of the two wires or sets of wires, and at these regions the wires are insulated from each other by a layer or layers formed on the surface(s) of the wire or wires and impregnated with heat sensitive insulating material.

In another method of construction one conductor may be a metal sheet or strip and the other conductor a mesh, suitably held in contact with the metal sheet or strip. Both the mesh and the sheet or strip may have an impregnated porous surface layer or only one of these two elements may be so treated. Two meshes in contact can be used in a similar way.

The device may be built up in the form of a composite layer on a surface of a part of a structure with which the device is associated, the surface forming one conductor of the device.

The structural part may itself be formed of a metal which can be treated to form an adherent porous layer of a compound of the metal or may be coated with such a metal. In either case a porous layer formed on the surface of the part is impregnated with a heat sensitive material and a conductive layer in the form of a coating or of a metallic sheet or strip is applied over the impregnated layer. The applied layer may be discontinuous, for example, it may consist of a mesh. When the applied layer is other than a coating it may itself carry an adherent porous layer impregnated with a heat sensitive insulating material, the two impregnated layers then being held in contact.

In an alternative construction the metallic surface of the structural element is left plain and the impregnated porous layer is formed on a sheet or strip applied to that surface. Again the sheet or strip applied may be in the form of a mesh.

The surface of the part of the structure, with which the device is associated, may for example be the engine nacelle of an aircraft. If this part is of aluminium or a suitable aluminium alloy the surface may be anodised, the anodic layer impregnated with a heat sensitive insulating material and a conductive coating applied over the impregnated layer. In use a potential will be applied to one or more terminals attached to the conductive coating and excess current leakage to the frame of the aircraft will indicate a rise in temperature on the surface of the nacelle. The conductive coating may be applied in strips spaced apart and a separate electrical connection made to each.

In cases where one conductor only is treated to form a porous layer, which is impregnated with a heat sensitive insulating material, the other conductor may be a layer of an electrically conductive lacquer, enamel or glaze applied over the impregnated layer.

The enamel used must be capable of withstanding temperatures to which the device is subjected in use and for this reason we prefer to use a heat resistant enamel, such as a silicone enamel. The enamel may be rendered semi-conductive by incorporating in it a finely divided metal, for example aluminium, in flake form (leafing metal). For example a suitable semi-conducting lacquer may be prepared by adding to silicone lacquer, between 50 to 85% of leafing aluminium, the exact quantity being determined by the conductivity it is desired to obtain in the dried film. A layer of insulating enamel or lacquer of a similar basic composition to the conducting layer may be applied over the conducting layer.

One advantage of the use of such an additional layer is that it acts as heat insulation and raises the operating temperature of the device. This is an advantage because many heat sensitive insulating materials which are otherwise suitable for use become electrically conductive at too low a temperature for the device to be used for detecting fires in apparatus which normally runs hot, such as an aircraft engine.

Where large areas are to be covered the lacquer or enamel may be applied by spraying. Other conventional methods such as brushing or dipping may be used where appropriate.

Examples of devices in accordance with the invention will hereinafter be described with reference to the accompanying drawings, in which:

Figures 8 and 9 are elevations, partly in cross-section, of heat sensitive cables;

Figures 10, 12 and 14 are perspective views of three further forms of the device dismantled to show the construction of the various parts;

Figures 11, 13 and 15 are cross-sectional views of the device shown in Figures 10, 12 and 14 respectively, and Figures 16 and 17 are circuit arrangements incorporating devices in accordance with the invention.

Figure 1:
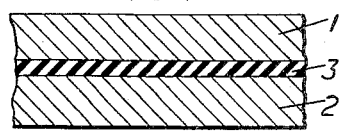
Figures 1, 2, 3, 4, 5 and 6 are diagrammatic representations of cross-sections through parts of various forms of the device.

Referring to the drawings, Figure 1 shows a simple form of the device consisting of a metal plate 1 forming one conductor and a metal plate 2 forming the other conductor, the plates 1 and 2 being separated by a porous layer 3 impregnated with a heat sensitive insulating material. The porous layer consists of a compound of the metal of the plate 2 formed by treatment of the plate 2 in such a way that an adherent porous layer is formed on its surface.

Figure 2:
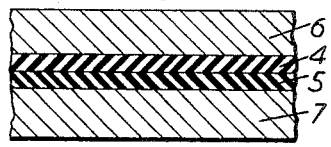

The device shown in Figure 2 differs only from that shown in Figure 1 in that porous layers 4 and 5 (similar to the porous layer 3) are formed on the contiguous surfaces of both plates 6 and 7.

Figure 3:
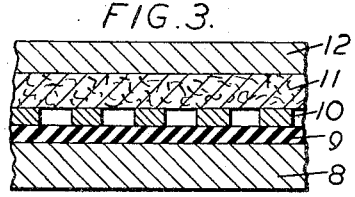

In the device shown in Figure 3, one conductor conductor consists of a metal plate 8 on which is formed a porous layer 9 and the other conductor is a metal mesh 10 which is held in contact with the porous layer 9 by a glass fibre mat 11 and a clamping plate 12. Any convenient method of securing the clamping plate may be used, for example where the device is applied to a cylindrical or similarly shaped surface in such a way as to pass partly or completely round its circumference, the clamping plate 12 may pass completely round the surface and be held in sufficient tension to exert the necessary pressure on the fibre mat 11.

Figure 4:
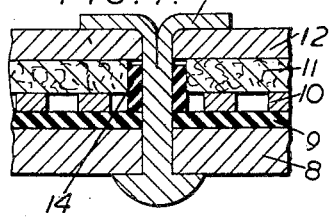

An alternative method of securing the clamping plate is shown in Figure 4 (in which the same references are used as in Figure 3). Here the clamping plate is secured by a number of rivets 13 passing through suitable apertures in the metal plate 8, the mesh 10, the fibre mat 11 and the plate 12 and through an insulating collar 14 which prevents accidental contact between the mesh 10 and the rivet 13.

Figure 5:
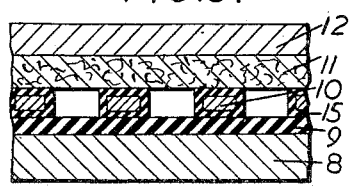

Figure 5 shows an alternative construction to that shown in Figure 3 in which the mesh 10 is itself provided with a porous layer 15 similar to the porous layer 9. A further possibility is to omit the porous layer 9 leaving the porous layer 15 on the mesh 10 in direct contact with the metal plate 8.

Figure 6:

Figure 6 shows a device in which a metal conductor 16 is provided with a porous layer 17 and the second conductor consists of a conductive or semi-conductive layer 18 deposited on the surface of the porous layer 17. The conductor 18 may be formed by metal spraying or by coating with a semi-conducting enamel, lacquer or glaze. Zinc and aluminium are the most suitable metals for spraying.

In the devices shown in Figures 1 and 2, either of the conductors may be an element of a struture with which the device is associated and in Figures 3, 4, 5 and 6 the conductor 8 or 16 may be such an element. Also in any of the devices shown in Figures 1 to 5, either or both conductors may be of a metal or alloy which cannot be treated to form on its surface a porous adherent layer of a compound of the metal. In these circumstances the conductor will be coated with a metal which does form such a compound and the compound formed on the surface so coated.

In the construction shown in Figure 4 the collar 14 may be omitted and the cylindrical surface of the rivet or the appropriate part of this surface may itself be treated to form a porous layer which is impregnated with a heat sensitive insulating material.

Figure 7:
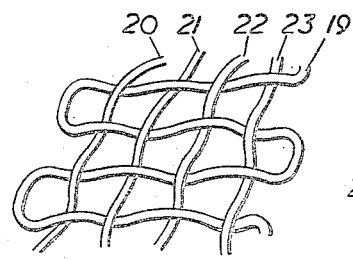
Figure 7 is a perspective view of another form of the device.

Figure 7 shows a woven mesh the warp of which consists of a wire 19 and the weft of which consists of wires 20, 21, 22 and 23. The wire 19 only, each of the wires 20 to 23 or all of the wires 19 to 23 may be provided on their surfaces with an adherent porous layer impregnated with a heat sensitive insulating material. One or more, but not all, of the wires 20 to 23 may be replaced by an insulating thread.

All of the wires 20 to 23 may be electrically connected together at one or both ends. Alternatively they may be connected in groups. Although the warp is shown as a single wire 19 it may obviously consist of a number of wires, in which case these wires may also be connected together or connected in groups.

Figure 8:
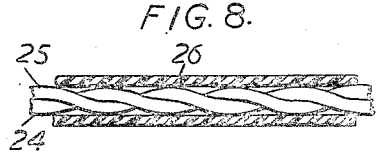

Figure 8 shows a heat sensitive electric cable consisting of two conductors 24 and 25 twisted together, for example one to three twists per inch length, and enclosed in a sheath 26 preferably of insulating material. Either one of the wires or both wires may be treated to form on its surface a porous layer which is impregnated with a heat sensitive insulating material. If necessary additional bare or insulated wires or threads of insulating material may be lapped round or twisted together with the pair of wires 24, 25 for the purpose of keeping the wires 24, 25 in close contact.

Figure 9 shows an alternative form of cable consisting of an inner conductor 27 which is provided on its surface with a porous impregnated layer and is enclosed in a tight fitting metal sheath 28. The sheath when applied may be of greater diameter than the outer diameter of the coated conductor 27 and may subsequently be drawn down to make it a tight fit on the conductor 27.

The device shown in Figures 10 and 11 consists of two aluminium or aluminium alloy foils 29 and 30 which are held together by aluminium channels 31 and 32. The channels 31 and 32 are insulated from the foil 30 by strips of glass fibre tape 33, 34 (see Figure 11). The foils 29 and 30 are formed with tags 35 and 36 for use as terminal connections. After assembly pressure is applied to close up the channels 31, 32 and press the foils 29, 30 into contact. Either or both of the foils 29 and 30 are anodised to form a porous surface layer which is impregnated with heat sensitive insulating material.

The device shown in Figures 12 and 13 is similar to that shown in Figures 10 and 11 except that instead of using the channel members 31, 32 for holding the two foils together, the edges 37 and 38 of one of the foils 39 are turned over to grip the foil 40. Again either or both of the foils may be anodised and impregnated with a heat sensitive insulating material. The foils are formed with terminal tags 41 and 42.

In the device shown in Figures 14 and 15, one foil 43 is gripped by the turned over edges of the other foil 44 but in this case the turned over edges make contact with a metal plate 45 which is spaced from the foil 43 by a glass fibre mat 46. Either or both of the foils 43 and 44 may be anodised and impregnated with a heat sensitive insulating material. The use of the extra plate 45 enables the foil 43 to be replaced by a metal mesh, consisting for example, of a sheet of expanded metal. The expanded metal is preferably rolled to reduce the roughness of its surfaces.

When using metal mesh it is important that all sharp edges should be smoothed since there is a tendency for such edges to penetrate the anodic film, causing a short circuit.

While in the smaller devices it is only necessary to use one coated and impregnated conductor, the use of two conductors with their coated surfaces in contact reduces considerably the risks of early failure of the device, due to short circuits.

It is preferable to use aluminium foil of a thickness not less than 10 mils since thinner foils are easily distorted by local heat. This precaution is particularly necessary when the devices are to be exposed to flame. Expanded metal mesh of an initial thickness of 15 mils or more has been found suitable. Meshes thinner than this lose so much metal during anodising that they become too frail and are easily destroyed by intense localised heating.

The devices will operate at a low voltage, a convenient voltage being 24 volts. Figure 16 shows a simple circuit which may be employed. The device consists of conductors 47 and 48 separated by a porous impregnated layer 49. The conductor 47 is connected to one terminal of a battery 50 through an ammeter 51 capable of measuring micro-amps and the conductor 48 is connected to the other terminal of the battery 50 through switch 52.

An alternative circuit arrangement for use in conditions where a number of separately energised devices are employed is shown in Figure 17. The devices, of which four are shown (53, 54, 55, 56), are connected to terminals of one bank 57 of a two-bank uni-selector switch. The corresponding terminals of the other bank 58 are connected to filament lamps 59, 60, 61, 62 etc. As the uni-selector switch rotates the devices 53 and 56 are successively connected in series with a D. C. supply 63 through the coil of a relay 64. When any of the devices 53 to 56 becomes sufficiently conductive the relay 64 breaks the power supply to the uni-selector switch so that it stops in the position in which the moving arm of the bank 57 makes contact with the terminal connected to the device in question. When this occurs the lamp corresponding to the device which has become conductive will remain alight until the uni-selector switch is restarted or until the conductivity of the device falls below the critical value.

Porous films produced by anodising in different electrolytes and in the same electrolytes under different conditions, when impregnated with heat sensitive insulating materials, show different responses to changes in temperature. It is believed that this variation of response is principally a function of the pore size. I prefer to carry out the anodic treatment in an acidic bath.

For example anodic films of different pore size can be produced by anodising aluminium foils in baths of sulphuric acid, oxalic acid or phosphoric acid. Using a 10% solution of sulphuric acid, a 4% solution of oxalic acid and a 4% solution of phosphoric acid and anodising a clean wire for ten minutes at 20° C. in each solution with an applied potential of 50 volts D. C., films are obtained which when impregnated with a 50% W. W. solution of potassium nitrate in water at 100° C. for one minute show little difference in final temperature response but pass a different leakage current before this temperature is reached. A stainless steel cathode is used in the oxalic and phosphoric acid baths and a lead cathode in the sulphuric acid bath.

The phosphoric acid type film, which has the largest pore structure, shows the highest leakage current at lower temperatures and a slightly lower final response temperature—about 358° C.

The sulphuric acid type film, which has a medium sized pore structure, shows a slightly lower leakage current than the phosphoric acid type and a slightly higher final response temperature.

The oxalic acid type film which has the smallest pore structure shows a leakage current lower than the sulphuric acid film. The leakage current/temperature curve, however, rises much more steeply than the other two nearer to the final response temperature which is slightly higher.

In cases where a low leakage current is desired the smaller pore sized film (oxalic acid type) may be used, particularly if a large surface area is used for the detection device in laminar forms. In cases where a higher leakage current is desired, or the surface contact between active media is small, for example in twisted wires, then the large pore sized film (phosphoric acid type) may be used.

Using an oxalic acid anodising bath as described above and potassium nitrate as the heat sensitive insulating material devices were prepared which with an applied potential of 24 v. D. C. showed no leakage current below 290° C., a leakage current of 30 microamps at 355° C. and of 120 microamps at 357° C.

Such elements are well suited to the detection of flames and will respond quickly when a flame impinges directly upon them.

Although particular reference has been made above to the use of the devices for the detection of flames in aircraft, for which they are extremely well suited, they can be used in a large variety of situations to indicate a change in temperature.

The determination of the nature and concentration of the heat sensitive material and the thickness and other characteristics of the porous layer necessary to give the required sensitivity is a matter of simple experiment.

What I claim as my invention is:

1. A temperature responsive electric cable comprising two wires twisted together, an anodic layer formed on the surface of at least one of said wires and a stable insulating material having a negative temperature coefficient of resistance permeating the anodic material, said conductors being separated by said anodic material.

2. A temperature responsive electric cable comprising an inner conductor, an anodic layer on the exposed surface of said inner conductor, a stable insulating material having a negative temperature coefficient of resistance permeating said layer and an outer conductor in the form of a tight fitting metal sheath in contact with said layer.

3. A temperature responsive electrical device comprising two conductors, one of which is a metal sheet and the other of which is a metal mesh, an anodic layer formed on a surface of at least one of said conductors and a stable insulating material having a negative temperature coefficient of resistance permeating said layer, said conductors being separated by the anodic material.

4. A temperature responsive electrical device comprising two conductors, one of which is a metal sheet and the other of which is a metal mesh, an anodic layer formed on a surface of at least one of said conductors, a stable insulating material having a negative temperature coefficient of resistance permeating said layer and means for supporting said conductors in such a way that they are separated by the anodic material.

5. A temperature responsive electrical device comprising a first conductor, an anodic layer on a surface of said first conductor, a stable insulating material having a negative temperature coefficient of resistance permeating said layer and a second conductor in the form of a deposit on said anodic layer.

6. A temperature responsive electrical device comprising a first conductor, an anodic layer on a surface of said first conductor, a stable insulating material having a negative temperature coefficient of resistance permeating said layer and a second conductor in the form of a sprayed metal layer on said anodic layer.

7. A temperature responsive electrical device comprising at least two wires woven to form a mesh, an anodic layer on the surface of at least one of said wires and a stable insulating material having a negative temperature coefficient of resistance permeating said layer, said wires being woven together in such a way that throughout the woven material thus formed there are regions in which said wires are separated only by the anodic material.

8. A temperature responsive electrical device comprising a conductor which is an element of a structure with which the device is associated, a second conductor, on the surface of at least one of said conductors an adherent layer of a compound of a metal present on said surface formed in situ on said surface from said metal and a stable insulating material having a negative temperature coefficient of resistance permeating said layer, said conductors being separated by said compound permeated with said heat sensitive material.

9. A temperature responsive electrical device comprising a conductor which is an element of a structure with which the device is associated, a second conductor, an anodic layer formed on a surface of at least one of said conductors, and a stable insulating material having a negative temperature coefficient of resistance permeating said layer, said conductors being separated by the anodic material.

10. A structure incorporating a metal element, an anodic layer on a surface of said element, a stable insulating material having a negative temperature coefficient of resistance permeating said layer and a second conductor in contact with said anodic layer, forming with said element a temperature responsive electrical device.

11. A method of manufacturing a temperature responsive electrical device which comprises anodising a surface of an aluminium or aluminium alloy conductor in an acid bath, impregnating the anodic layer with a stable insulating material having a negative temperature coefficient of resistance and arranging the anodic layer in contact with a second conductor.

12. A method of manufacturing a temperature responsive electrical device which comprises anodising a surface of an aluminium or aluminium alloy conductor in an acid bath, impregnating the anodic layer with a stable insulating material having a negative temperature coefficient of resistance and arranging the anodic layer in contact with a similar impregnated anodic layer formed on a second conductor.

13. A temperature responsive electrical cable comprising two conductors, an adherent layer of a compound of a metal present at the surface of one conductor formed in situ on said surface from said metal, separating said conductors, and a stable insulating material having a negative temperature coefficient of resistance permeating said layer.

14. A temperature responsive electrical cable comprising two conductors, formed in situ on surfaces of each conductor from a metal present at said surface of the conductor, an adherent layer of a compound of said metal, said layers being in contact, and a stable insulating material having a negative temperature coefficient of resistance permeating said layers.

15. A temperature responsive electrical device comprising at least two metal wires woven to form a mesh, on the surface of at least one of said wires an adherent layer of a compound of a metal present at said surface, formed in situ on said surface from said metal, and a stable insulating material having a negative temperature coefficient of resistance permeating said layer, said wires being woven together in such a way that throughout the woven material thus formed there are regions in which said wires are separated only by said compound and the insulating material which permeates it.

16. A temperature responsive electrical device comprising a first conductor, an adherent layer of a compound of a metal present at the surface of said first conductor, formed in situ on said surface from said metal, a stable insulating material having a negative temperature coefficient of resistance permeating said layer and a second conductor in the form of a deposit on said layer.

17. A temperature responsive electrical device comprising two conductors and, separating said conductors, a porous adherent layer formed in situ on the surface of at least one of said conductors from a compound present at said surface and a stable insulating material having a negative temperature coefficient of capacitance permeating the porous material separating said conductors.

18. A temperature responsive electrical device comprising two conductors and, separating said conductors, an anodic layer formed on the surface of at least one of said conductors and a stable insulating material having a negative temperature coefficient of capacitance permeating the anodic material separating said conductors.

19. A fire alarm system which comprises two conductors and, separating said conductors, a porous adherent layer formed in situ on the surface of at least one of said conductors from a compound present at said surface, a stable insulating material having a negative temperature coefficient of capacitance permeating the porous material separating said conductors, an electrical supply source, electrical connections between said source and said conductors and in the circuit thus formed a device responsive to a fall of resistance between said conductors.

20. A fire alarm system which comprises two conductors and, separating said conductors, an anodic layer formed on the surface of at least one of said conductors, a stable insulating material having a negative temperature coefficient of capacitance permeating the anodic material separating said conductors, an electrical supply source, electrical connections between said source and said conductors and in the circuit thus formed a device responsive to a fall of resistance between said conductors.

References Cited in the file of this patent

UNITED STATES PATENTS

| | | |
|---|---|---|
| 916,280 | Donitz | Mar. 23, 1909 |
| 2,282,344 | Ruben | May 12, 1942 |
| 2,659,067 | Peters | Nov. 10, 1953 |
| 2,686,244 | Dahm et al. | Aug. 10, 1954 |
| 2,688,648 | McIlvaine | Sept. 7, 1954 |